(12) United States Patent
Porter (10) Patent No.: US 9,765,529 B2
(45) Date of Patent: Sep. 19, 2017

(54) PANEL FASTENER

(71) Applicant: Charles Porter, Blythewood, SC (US)

(72) Inventor: Charles Porter, Blythewood, SC (US)

( * ) Notice: Subject to any disclaimer, the term of this patent is extended or adjusted under 35 U.S.C. 154(b) by 0 days.

(21) Appl. No.: 15/259,260

(22) Filed: Sep. 8, 2016

(65) Prior Publication Data

US 2017/0073961 A1 Mar. 16, 2017

Related U.S. Application Data

(60) Provisional application No. 62/217,138, filed on Sep. 11, 2015.

(51) Int. Cl.
| | | |
|---|---|---|
| *F16B 13/08* | (2006.01) | |
| *F16B 21/09* | (2006.01) | |
| *E04F 13/08* | (2006.01) | |
| *F16B 13/00* | (2006.01) | |
| *F16B 5/06* | (2006.01) | |
| *F16B 5/07* | (2006.01) | |
| *F16B 21/06* | (2006.01) | |

(52) U.S. Cl.
CPC ........ *E04F 13/0805* (2013.01); *F16B 5/0642* (2013.01); *F16B 5/07* (2013.01); *F16B 13/00* (2013.01); *F16B 21/065* (2013.01); *F16B 21/09* (2013.01)

(58) Field of Classification Search
CPC ...... E04B 1/48; E04F 13/0805; F16B 5/0642; F16B 5/07; F16B 21/09; F16B 21/065; F16B 13/00
USPC ......... 52/701, 702, 704, 706, 708, 709, 711; 248/231.91
See application file for complete search history.

(56) References Cited

U.S. PATENT DOCUMENTS

| | | | | |
|---|---|---|---|---|
| 1,272,696 A | | 7/1918 | Mock | |
| 1,294,584 A | | 3/1919 | Mock | |
| 1,602,431 A | * | 10/1926 | Honens | E04B 1/4135 52/711 |
| 1,729,879 A | * | 10/1929 | Krantz | H02B 1/40 248/906 |
| 1,732,699 A | * | 10/1929 | Selah | E04B 1/4135 248/615 |
| 2,292,948 A | * | 8/1942 | Kendall | H01B 17/20 174/165 |
| 2,320,400 A | * | 6/1943 | Bedell | H02G 3/123 220/3.6 |
| 2,697,857 A | * | 12/1954 | Eckel | F16B 5/06 411/500 |

(Continued)

*Primary Examiner* — Brent W Herring
(74) *Attorney, Agent, or Firm* — McNair Law Firm, P.A.; Seann P. Lahey (57) ABSTRACT

A panel fastener for removably flush mounting a wall panel to a wood furring. The panel fastener includes a mounting body adapted for being inserted into a complementary opening in the wood furring. A hanger slot is disposed in the mounting body for receiving a hanger member carrying the wall panel. A slot flange is disposed within a portion of the hanger slot and defining a narrowed hanger channel receiving and securing the hanger member. A crush ridge is disposed on a rear side of the slot flange for engaging the hanger member. A slot cap disposed in a rear side of the hanger slot and including a locking arm engaging the hanger member when inserted into the narrowed hanger channel of the slot flange for resisting removal of the hanger member from the narrowed hanger channel.

19 Claims, 6 Drawing Sheets

(56) References Cited

U.S. PATENT DOCUMENTS

| | | | |
|---|---|---|---|
| 3,018,080 A * | 1/1962 | Loudon | E04B 9/006 248/228.4 |
| 3,216,584 A | 11/1965 | Sedo | |
| 3,228,644 A | 1/1966 | Sand | |
| 3,261,578 A | 7/1966 | Himebaugh | |
| 3,385,156 A | 5/1968 | Polos | |
| 3,529,799 A * | 9/1970 | Schaefer | A47G 1/1613 248/496 |
| 3,861,639 A * | 1/1975 | Morrill | A47G 1/1606 248/489 |
| 3,955,790 A | 5/1976 | Ballin | |
| 4,333,575 A | 6/1982 | Wong | |
| 4,337,915 A | 7/1982 | Cali | |
| 4,458,873 A | 7/1984 | Sutherland | |
| 4,460,147 A * | 7/1984 | Macbain | F16B 12/22 248/222.41 |
| 4,502,256 A * | 3/1985 | Hahn | E04D 5/143 24/459 |
| 4,509,713 A | 4/1985 | Hogg | |
| 4,572,708 A | 2/1986 | Fischer | |
| 4,632,285 A | 12/1986 | Dillingham | |
| 4,658,558 A * | 4/1987 | Verble | E04D 5/143 411/431 |
| 4,669,169 A | 6/1987 | Hogg | |
| 4,724,281 A | 2/1988 | Nix et al. | |
| 4,775,129 A * | 10/1988 | Gleisten | A47G 1/162 248/493 |
| 4,804,161 A | 2/1989 | Wallo | |
| 4,828,439 A | 5/1989 | Giannuzzi | |
| 4,871,140 A | 10/1989 | Hoskinson et al. | |
| 4,903,851 A | 2/1990 | Slough | |
| 4,903,934 A * | 2/1990 | Fremstad | A47G 1/1626 248/222.52 |
| 4,999,963 A * | 3/1991 | Verble | E04D 5/143 52/410 |
| 5,032,856 A * | 7/1991 | McMinn | G03B 29/00 348/360 |
| 5,069,412 A | 12/1991 | Jacob | |
| 5,236,344 A | 8/1993 | Baron | |
| 5,328,139 A | 7/1994 | Barnes | |
| 5,425,524 A * | 6/1995 | Messina, Jr. | A47G 1/1606 248/475.1 |
| 5,433,416 A * | 7/1995 | Johnson | B65D 23/003 248/475.1 |
| 5,467,571 A * | 11/1995 | Khatibi | E04F 19/0463 403/388 |
| 5,488,808 A * | 2/1996 | Cahill | E04B 2/7425 292/241 |
| 5,509,560 A | 4/1996 | Nash | |
| 5,588,629 A | 12/1996 | Barnes | |
| 5,605,313 A * | 2/1997 | Erickson | A47G 1/1606 248/467 |
| 5,749,558 A | 5/1998 | Wallo | |
| 5,809,703 A * | 9/1998 | Kelly | E04B 1/4107 52/125.5 |
| 5,931,432 A | 8/1999 | Herold et al. | |
| 5,953,865 A * | 9/1999 | Rickards | E04H 13/006 52/139 |
| 6,042,078 A | 3/2000 | Donovan | |
| 6,095,478 A | 8/2000 | Barnes | |
| 6,102,360 A * | 8/2000 | Clegg | H02G 3/14 174/55 |
| 6,170,685 B1 | 1/2001 | Currier | |
| 6,186,466 B1 | 2/2001 | Baird et al. | |
| 6,240,182 B1 * | 5/2001 | Gillett | H04M 1/11 379/435 |
| 6,241,368 B1 | 6/2001 | Depino | |
| 6,250,865 B1 | 6/2001 | McSherry | |
| 6,308,486 B1 * | 10/2001 | Medland | E04F 19/06 52/478 |
| 6,346,674 B1 * | 2/2002 | Gretz | H02G 3/123 174/481 |
| D454,481 S * | 3/2002 | DeLine | D8/373 |
| D484,778 S * | 1/2004 | French | D8/373 |
| 6,719,260 B1 * | 4/2004 | Hart | A47G 1/168 248/466 |
| 6,758,455 B2 | 7/2004 | Weck et al. | |
| 6,769,660 B2 | 8/2004 | DeLine | |
| 6,880,795 B1 | 4/2005 | Haynes | |
| 7,077,610 B2 * | 7/2006 | Diaz | F16B 5/02 411/21 |
| 7,150,596 B2 * | 12/2006 | Diaz | F16B 5/02 411/21 |
| 7,198,244 B2 | 4/2007 | Deline | |
| 7,300,025 B2 * | 11/2007 | Korcz | H02G 3/123 220/3.9 |
| 7,311,022 B2 * | 12/2007 | Putney | 81/121.1 |
| 7,316,078 B2 | 1/2008 | Hagman | |
| D572,122 S | 7/2008 | Cave | |
| 7,427,053 B2 | 9/2008 | Nawrocki | |
| 7,468,487 B1 * | 12/2008 | Murphy | H02G 3/123 174/53 |
| 7,594,636 B2 | 9/2009 | Wong | |
| 7,600,956 B2 | 10/2009 | McDuff et al. | |
| 7,628,366 B2 * | 12/2009 | Scott | F16B 13/0808 248/317 |
| 7,677,521 B2 * | 3/2010 | Price | A47G 1/24 248/475.1 |
| 7,682,116 B2 * | 3/2010 | Cabrele | F16B 13/001 411/451.1 |
| 7,759,576 B1 * | 7/2010 | Gretz | H02G 3/123 174/480 |
| 7,877,948 B2 * | 2/2011 | Davies | B60R 13/01 411/354 |
| 8,044,300 B1 * | 10/2011 | Gretz | H02G 3/123 174/57 |
| 8,076,575 B1 * | 12/2011 | Gretz | H02G 3/123 174/481 |
| 8,142,122 B2 | 3/2012 | McDuff et al. | |
| 8,148,634 B1 * | 4/2012 | Gretz | H02G 3/123 174/481 |
| 8,148,635 B1 * | 4/2012 | Gretz | H02G 3/123 174/481 |
| 8,282,318 B2 * | 10/2012 | Robertson, Jr. | E21D 21/008 405/259.1 |
| 8,287,217 B2 | 10/2012 | Pisoni | |
| 8,303,225 B2 | 11/2012 | Kearl et al. | |
| 8,317,444 B1 * | 11/2012 | Hensley | F16B 35/04 411/107 |
| 8,439,613 B1 | 5/2013 | Prentice | |
| 8,445,779 B1 | 5/2013 | Gretz | |
| 8,449,236 B2 * | 5/2013 | McDuff | F16B 13/0808 411/340 |
| 8,720,156 B2 * | 5/2014 | Porter | F16B 21/09 411/349 |
| 8,757,568 B2 * | 6/2014 | Ko | F16M 13/02 211/86.01 |
| 8,898,945 B2 * | 12/2014 | Miller | A47G 1/162 40/713 |
| 9,441,774 B2 * | 9/2016 | Lashinske | F16M 13/02 |
| 9,521,916 B2 * | 12/2016 | Miller | A47G 1/162 |
| 2002/0033437 A1 | 3/2002 | Lemire | |
| 2002/0187017 A1 * | 12/2002 | Rogers | F16B 21/02 411/349 |
| 2005/0006554 A1 * | 1/2005 | DeLine | A47G 1/1606 248/475.1 |
| 2005/0051564 A1 | 3/2005 | Pimpinella | |
| 2006/0032343 A1 * | 2/2006 | Putney | F16D 1/101 81/125 |
| 2006/0113264 A1 | 6/2006 | Ferber et al. | |
| 2007/0119109 A1 * | 5/2007 | Kuelker | B28B 23/005 52/364 |
| 2008/0072515 A1 * | 3/2008 | Huhnerbein | F16B 12/2009 52/582.2 |
| 2009/0003962 A1 | 1/2009 | McDuff et al. | |
| 2010/0199598 A1 * | 8/2010 | Townsend | F16M 13/02 52/745.21 |
| 2010/0257796 A1 * | 10/2010 | Bertke | E04F 11/1812 52/263 |
| 2011/0071683 A1 | 3/2011 | Turton | |

(56) References Cited

U.S. PATENT DOCUMENTS

| | | | |
|---|---|---|---|
| 2011/0271635 A1* | 11/2011 | Kearl | A47G 1/1633 52/705 |
| 2013/0343831 A1 | 12/2013 | McDuff et al. | |
| 2014/0075882 A1* | 3/2014 | Porter | F16B 21/09 52/745.09 |
| 2015/0144756 A1* | 5/2015 | Miller | A47G 1/162 248/231.91 |

* cited by examiner

PANEL FASTENER

BACKGROUND OF THE INVENTION

1) Field of the Invention

The present invention relates to mounting wall panels, and more particularly, to panel fastener hardware for removably installing wall paneling onto a wood furring.

2) Description of Related Art

Paneling is a popular wall covering because it is attractive and durable. However, it can be problematic to install because it must be properly aligned, the front surface must remain intact, it is heavy, and it is difficult to work with because panels can be large and cumbersome.

Installing paneling can also be problematic because conventional wall hangers tend to leave gaps between the panel and wall, which would be both unstable and unattractive for paneling. While wall paneling can be flush mounted by directly adhering a panel to a wall using an adhesive or nail plates, this is also undesirable because it does not accommodate panel movement due to expansion and contraction, and can ruin the panels if removal is required.

Accordingly, it is an object of the present invention to provide a panel fastener system that is simple, strong, and precise, yet still allows for minor movement of the panels after installation to accommodate panel expansion and contraction.

It is a further object of the present invention to provide a panel fastener system that is easy to use, fast to install and inexpensive.

It is also a further object of the present invention to provide a panel fastener system that is configured to securely hold the wall panel on a wood furring in a removable manner.

SUMMARY OF THE INVENTION

The above objectives are accomplished according to the present invention by providing a panel fastener for removably flush mounting a wall panel to a wood furring, said panel fastener comprising a mounting body adapted for being inserted into a complementary opening in the wood furring; a hanger slot disposed in said mounting body for receiving a hanger member carrying the wall panel; said hanger slot including a generally U-shaped slot flange disposed within a portion of said hanger slot and defining a narrowed hanger channel for securing said hanger member in said hanger slot; and, said slot flange including a first angled bottom surface and a second angle bottom surface arranged in a generally "V" shape so that when said hanger member is received in slot flange, said hanger member engages and rests on said first and second angled bottom surfaces which centers said hanger member within said narrowed hanger channel.

In a further advantageous embodiment, a series of ridges extend circumferentially around an exterior side surface of said mounting body for engaging the wood furring when inserted into said complementary opening.

In a further advantageous embodiment, the series of ridges are angled toward a front surface to resist removal of said mounting body from said wood furring.

In a further advantageous embodiment, the slot flange includes angled receiving faces disposed along an upper portion on opposing sides of said slot flange directing entry of said hanger member into said narrowed hanger channel.

In a further advantageous embodiment, each of said angled receiving faces extend in a first direction sloping from an interior side wall of said hanger channel to a side wall of said slot flange defining said narrowed hanger channel.

In a further advantageous embodiment, each of said angled receiving faces extend in a second direction from a front wall of said slot flange to a rear wall of said slot flange defining a rounded shoulder that angles downwardly into said narrowed hanger channel.

In a further advantageous embodiment, each of said angled receiving faces biases said hanger member inwardly toward a rear surface of said mounting body upon entering said narrowed hanger channel to direct the wall panel carried by said hanger member against the wood furring.

In a further advantageous embodiment, a crush ridge is disposed on said slot flange for engaging said hanger member to assist in forming a friction fit arrangement between said hanger member and said slot flange.

In a further advantageous embodiment, the crush ridge is deformable when engaged by said hanger member to reduce slack between said hanger member and said slot flange for forming said friction fit arrangement.

In a further advantageous embodiment, the hanger member includes a head portion laterally spaced from a support collar along a shaft, wherein said hanger member is carried in said narrowed hanger channel with said slot flange disposed between said head portion and said support collar.

In a further advantageous embodiment, the slot flange is recessed from a front surface of said mounting body defining a flange recess area in a portion of said hanger slot.

In a further advantageous embodiment, the support collar is disposed in said flange recess area so that only said shaft of said hanger member extends beyond said front surface of said mounting body.

In a further advantageous embodiment, the support collar is laterally movable within said flange recess area to accommodate lateral shifting of said hanger member in said narrowed hanger channel.

In a further advantageous embodiment, the hanger member is laterally movable between side walls of said slot flange when disposed within said narrowed hanger channel to provide play during installation and accommodate panel expansion.

In a further advantageous embodiment, a slot cap is disposed in a rear side of said mounting body enclosing a rear side of hanger slot.

In a further advantageous embodiment, the slot cap includes a locking arm for engaging a head portion of said hanger member when inserted into said narrowed hanger channel of said slot flange to resist removal of said hanger member from said narrowed hanger channel.

In a further advantageous embodiment, the locking arm is flexibly carried by the slot cap so that when said hanger member is directed into said narrowed hanger channel said hanger member biases said locking arm outwardly.

In a further advantageous embodiment, the locking arm includes a securing lip defining a clear edge for engaging said hanger member when positioned within said narrowed hanger channel and locking said hanger member in said narrowed hanger channel.

In a further advantageous embodiment, the slot cap is removable from said mounting body and said locking arm includes a securing ridge on an opposite side surface from said securing lip for engaging said hanger member, wherein said securing ridge is defined by a rounded edge for releasable securing said hanger member in said narrowed hanger channel.

The above objectives are further accomplished according to the present invention by providing a method of flush mounting a wall panel to a wood furring comprising the steps of cutting an opening into the wood furring complementary to a circumference of a panel fastener, said panel fastener comprising a mounting body; a hanger slot disposed within said mounting body; a generally U-shaped slot flange disposed within a portion of said hanger slot and defining a narrowed hanger channel for securing said hanger member in said hanger slot; and, a first angled bottom surface and a second angle bottom surface included in said slot flange being arranged in a generally "V" shape so that when said hanger member is received in said slot flange, said hanger member engages and rests on said first and second angled bottom surfaces which centers said hanger member within said narrowed hanger channel; inserting said panel fastener into said complementary opening cut into said wood furring so that a front surface of said mounting body is flush with an exterior side of said wood furring; inserting a marking member into said hanger slot with a marking point extending outward from said hanger slot; aligning said wall panel against said wood furring at the desired position for installation; pressing said wall panel toward said wood furring once aligned in the desired position so that said marking member makes an indent mark on said wall panel; inserting a hanger member into said wall panel at said indent mark so that the remainder of said hanger member projection from said wall panel is receivable into said hanger slot; and, inserting said hanger member projecting from said wall panel into said hanger slot so that said wall panel is flush mounted to said wood furring.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiments and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Referring to FIGS. 1-5, a panel fastener, designated generally as 10, is shown for flush mounting a wall panel onto a wood furring. In the illustrated embodiment, panel fastener 10 includes an elongated mounting body 12. Mounting body 12 may be any shape, such as triangular, rounded, oval, square, and so forth, and is not limited to the elongated embodiment illustrated in the figures. Further referring to FIG. 11, elongated mounting body 12 is adapted to be inserted into a complementary elongated opening 14 formed in wood furring 16 so that elongated mounting body 12 engages an interior portion of wood furring 16 in a friction fit arrangement. As detailed herein, a wall panel 18 is then mounted to and carried by panel fastener 10 flush with wood furring 16 in a secure but removable manner.

Referring to FIGS. 1, 2, 4-5, to promote a secure engagement of elongated mounting body 12 with the interior portion of wood furring 16 defining complementary opening 14, panel fastener 10 includes a series of ridges 20 extending circumferentially around an exterior side surface of mounting body 12. Ridges 20 engage the interior portion of wood furring 16 to resist panel fastener 10 from backing out of complementary opening 14 once inserted therein. Preferable, as in the illustrated embodiment, ridges 20 are angled toward a front surface 24 to allow for easier insertion of mounting body 12 into wood furring 16, but dig into wood furring 16 to resist backing-out of mounting body 12.

Figure 11:
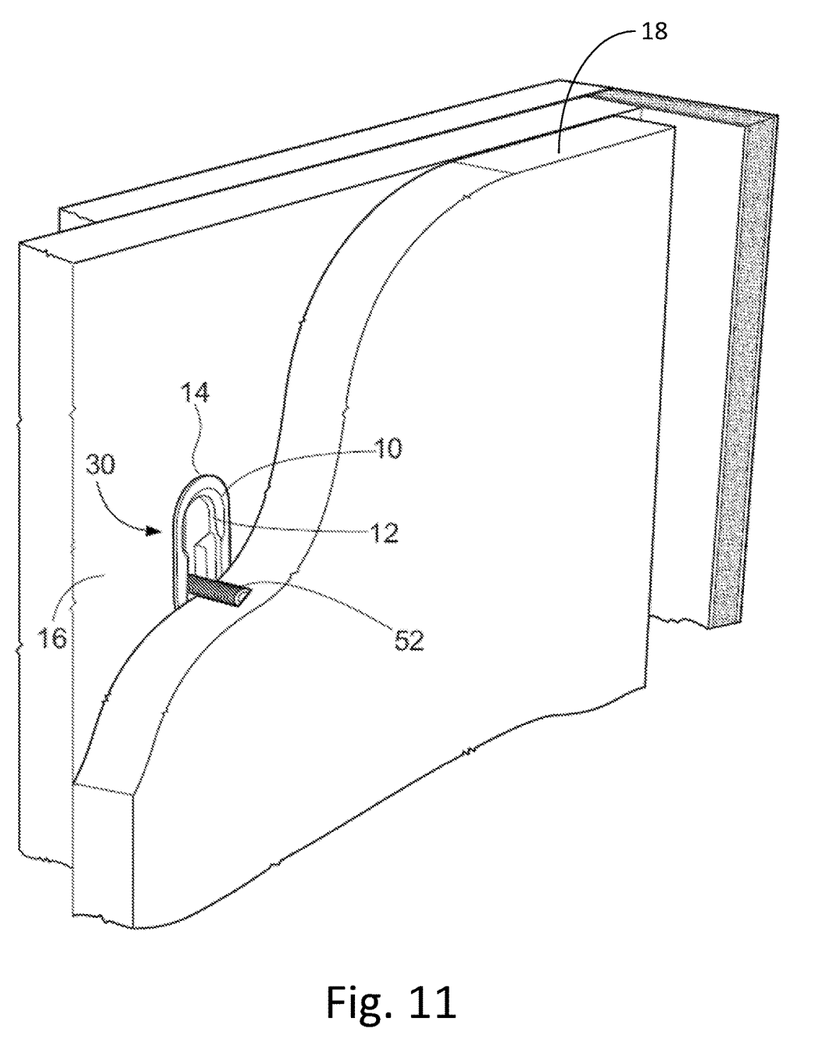

Referring to FIGS. 1-5, a flat front surface 24 is disposed on mounting body 12. Front surface 24 further includes a flange 28. Flange 28 extends laterally outward beyond ridges 20 of mounting body 12. With reference to FIG. 11, flange 28 engages an exterior surface, designated generally as 30, of wood furring 16 when inserted into complementary opening 14 of wood furring 16 so that front surface 24 is disposed generally flush with exterior surface 30 of wood furring 16 when mounted.

Figure 10:
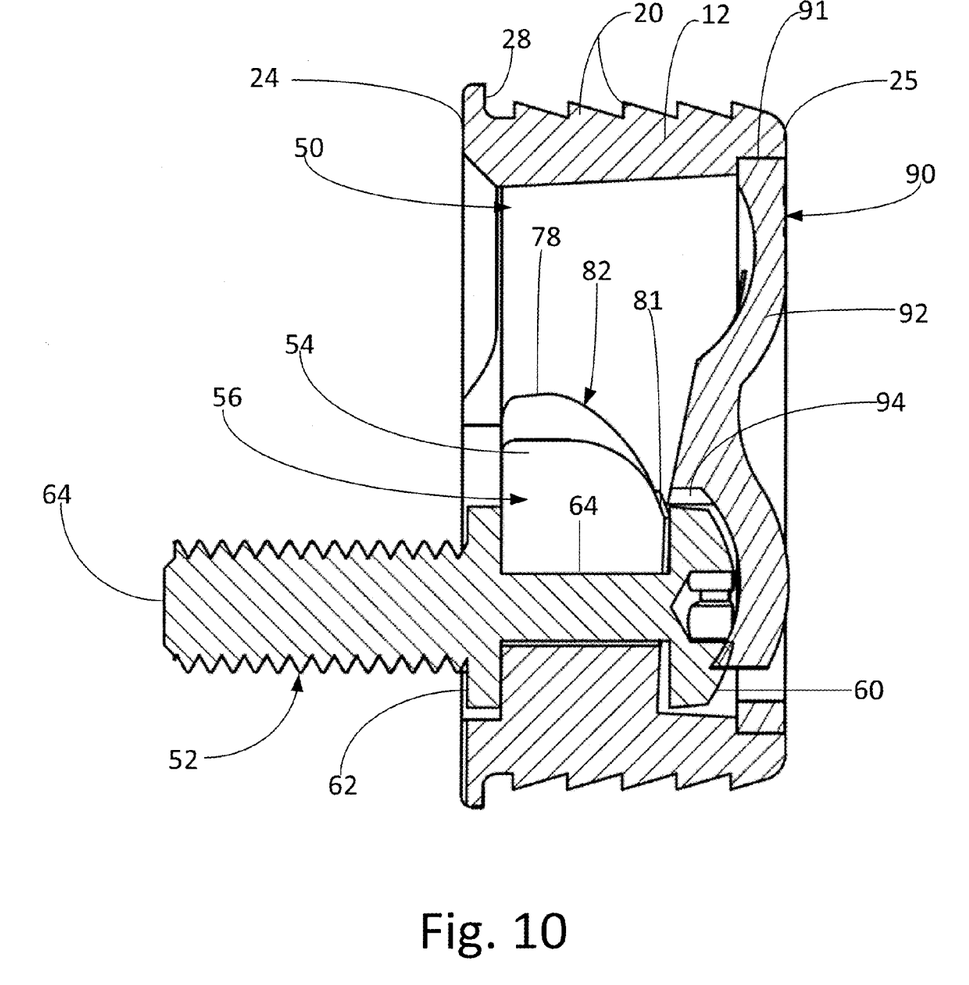
FIG. 10 shows a side elevation cross-section view of the panel fastener with the slot cap engaging a hanger member according to the present invention; and, FIG. 11 shows a cut-away view of a wall panel mounted to a wood furring with the panel fastener according to the present invention.

Referring to FIGS. 1-5, a hanger slot, designated generally as 50, is disposed in and extends through elongated mounting body 12 from front surface 24 to a rear surface 25. With further reference to FIG. 10, hanger slot 50 is adapted for receiving a hanger member, designated generally as 52. Hanger member 52 carries wall panel 18 (FIG. 11).

Hanger slot 50 includes a generally U-shaped slot flange 54 disposed within a portion of hanger slot 50. Slot flange 54 defines a narrowed hanger channel 56 receiving and securing hanger member 52 in hanger slot 50. Further, slot flange 54 is recessed from front surface 24 defining a flange recess area, designated generally as 58, in a portion of hanger slot 50, which received a portion of hanger member 52 as detailed herein below.

Referring to FIG. 10, in the illustrated embodiment, hanger member 52 includes a head portion 60 laterally spaced from a support collar 62 along a shaft 64. Hanger member 52 is carried in narrowed hanger channel 56 with slot flange 54 disposed between head portion 60 and support collar 62 to hold hanger member 52 in hanger slot 50. Additionally, support collar 62 is disposed in flange recess area 58 so that only shaft 64 of hanger member 52 extends beyond front surface 24.

Figure 3:
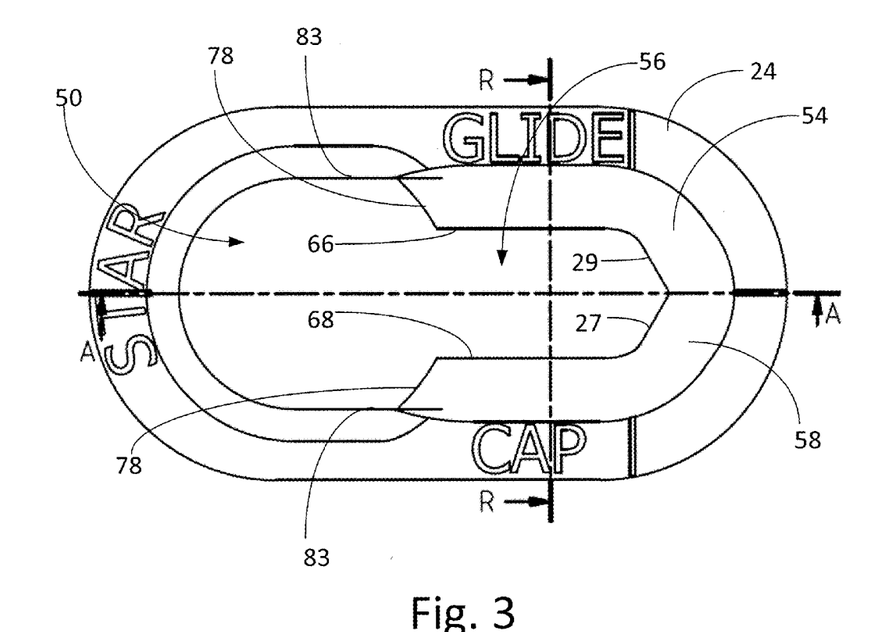
FIG. 3 shows a front elevation view of the panel fastener according to the present invention.
Figure 5:
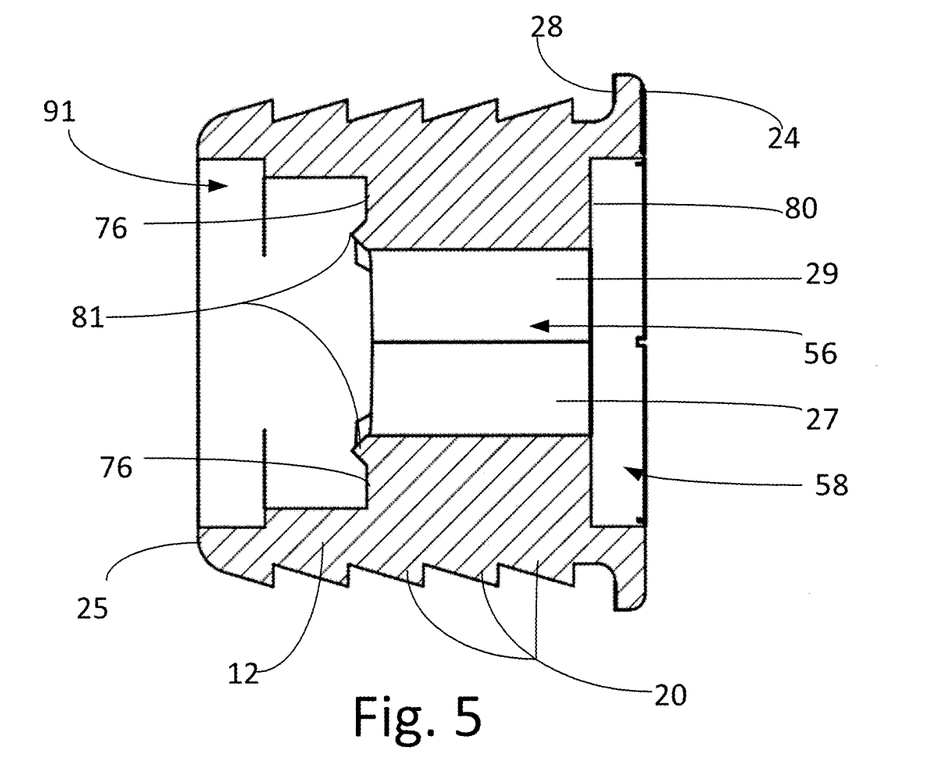
FIG. 5 shows a top elevation cross-section view of the panel fastener along section line R-R of FIG. 3 according to the present invention.
Figure 6:
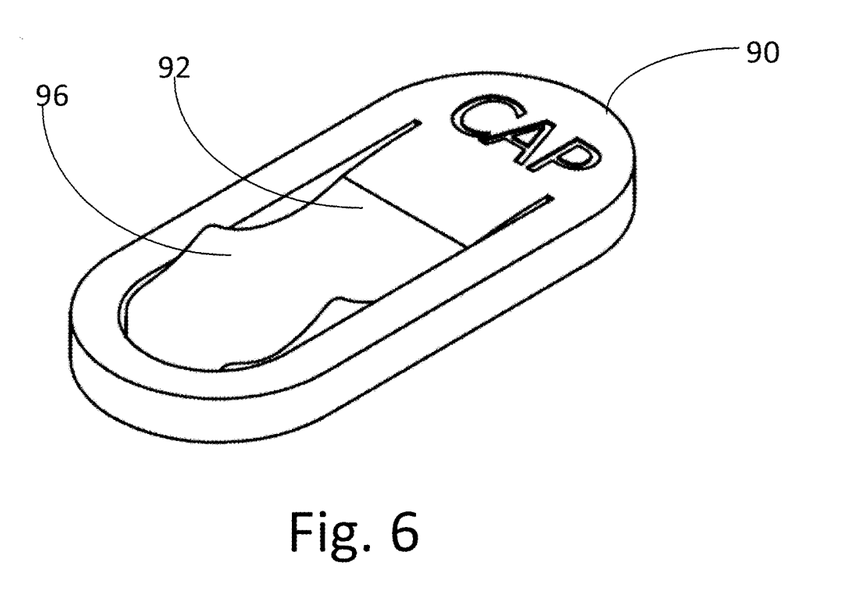
FIG. 6 shows a front perspective view of the slot cap according to the present invention.
Figure 7:
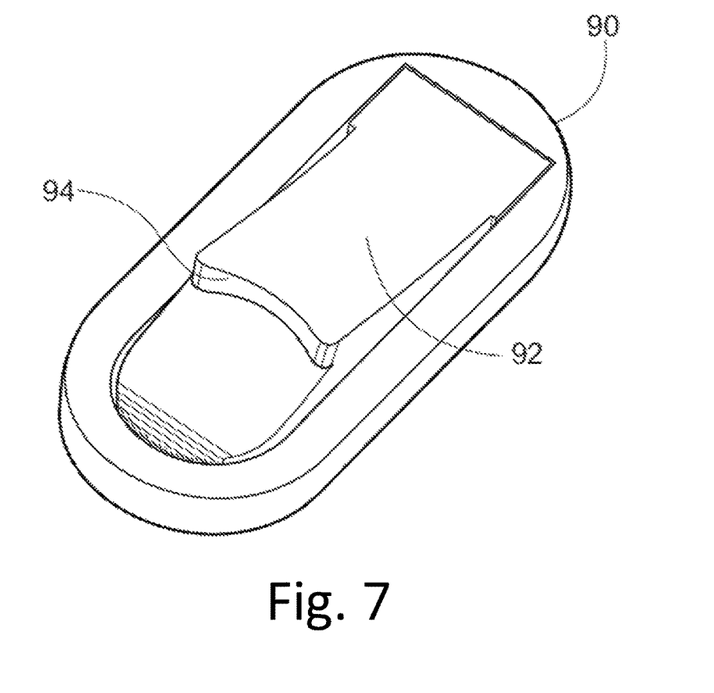
FIG. 7 shows a rear perspective view of the slot cap according to the present invention.
Figure 8:
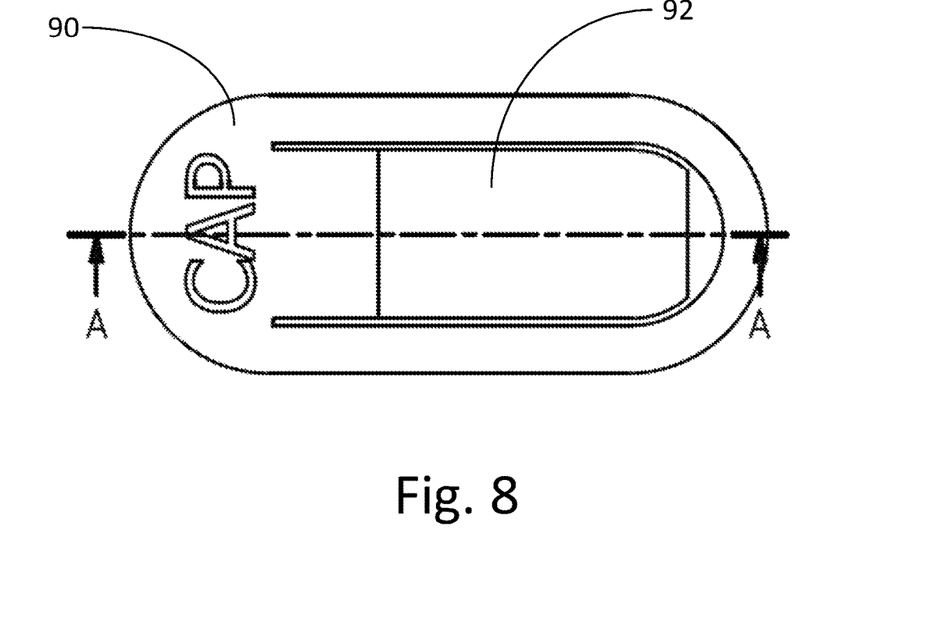
FIG. 8 shows a front elevation view of the slot cap according to the present invention.
Figure 9:
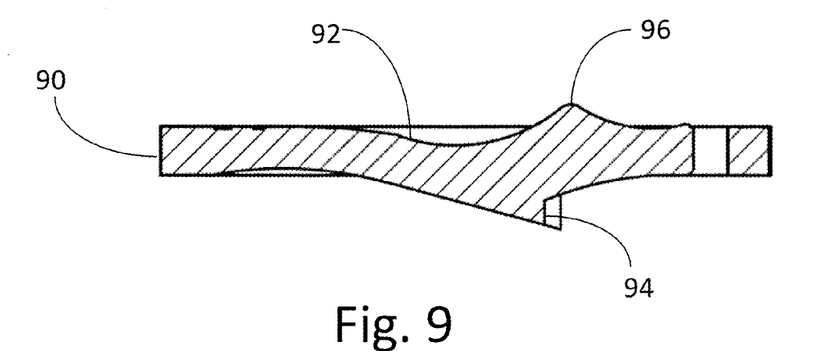
FIG. 9 shows a side elevation cross-section view of the slot cap along section line A-A of FIG. 8 according to the present invention.

Referring to FIGS. 3 and 5, hanger member 52 is laterally movable between side walls 66, 68 of slot flange 54 when disposed within narrowed hanger channel 56 to provide play during installation and accommodate panel expansion. Accordingly, flange recess area 58 is constructed and arranged to accommodate the intended shifting movement of hanger member 52 so that support collar 62 has sufficient room to move laterally within flange recess area 58 when shaft 64 shifts within narrowed hanger channel 56.

Further, slot flange 54 includes a first angled bottom surface 27 and a second angle bottom surface 29 arranged in a generally "V" shape. When hanger member 52 is received in slot flange 54, shaft 64 engages and rests on first and second angled bottom surfaces 27, 29 which centers hanger member 52 within narrowed hanger channel 56. Additionally, during the installation process detailed herein below, a marker member which is essentially pin, can be placed in narrowed hanger channel 56, which is centered within narrowed hanger channel 56 by first and second angled bottom surfaces 27, 29.

Figure 4:
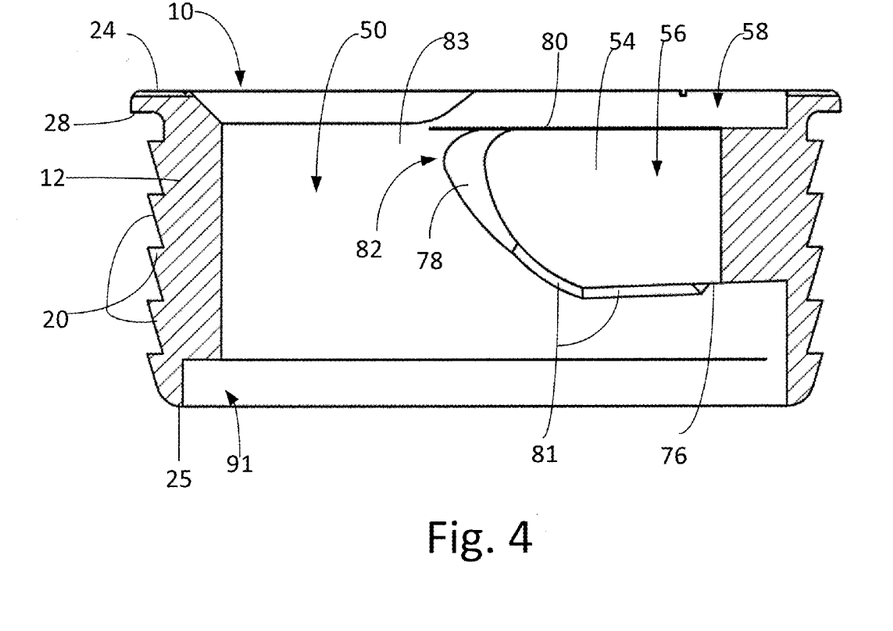
FIG. 4 shows a side elevation cross-section view of the panel fastener along section line A-A of FIG. 3 according to the present invention.

Referring to FIGS. 3 and 4, slot flange 54 is adapted to facilitate entry of hanger member 52 into narrowed hanger channel 56 and, thereby, to direct wall panel 18 against wood furring 16. In the illustrated embodiment, an angled receiving face 78 is disposed along an upper portion 82 on both sides of slot flange 54. The angled receiving faces 78 extend in a first direction sloping from an interior side wall 83 of hanger channel 50 to a side wall 66, 68, respectively, of slot flange 54 defining narrowed hanger channel 56. The angled receiving faces 78 further extend in a second direction from a front wall 80 of slot flange 54 to a rear wall 76, defining a rounded shoulder that angles downwardly into narrowed hanger channel 56. Angled receiving faces 78 are angled inwardly toward narrowed hanger channel 56, as best shown in FIG. 3. In use, as hanger member 52 is inserted into hanger slot 50, the rounded shoulders defined by angled receiving faces 78 help receive and directed hanger member 52 smoothly into narrowed hanger channel 56. Upon entering narrowed hanger channel 56, hanger member 52 is biased inwardly toward rear surface 25 by angled receiving faces 78 to help directed wall panel 18 carried by hanger member 52 against wood furring 16. Finally, the parallel surfaces of front wall 80 and rear wall 76 defining a lower portion of slot flange 54 help hold hanger member 52 in position within narrowed hanger channel 56 by engaging head portion 60 and support collar 62.

Figure 1:
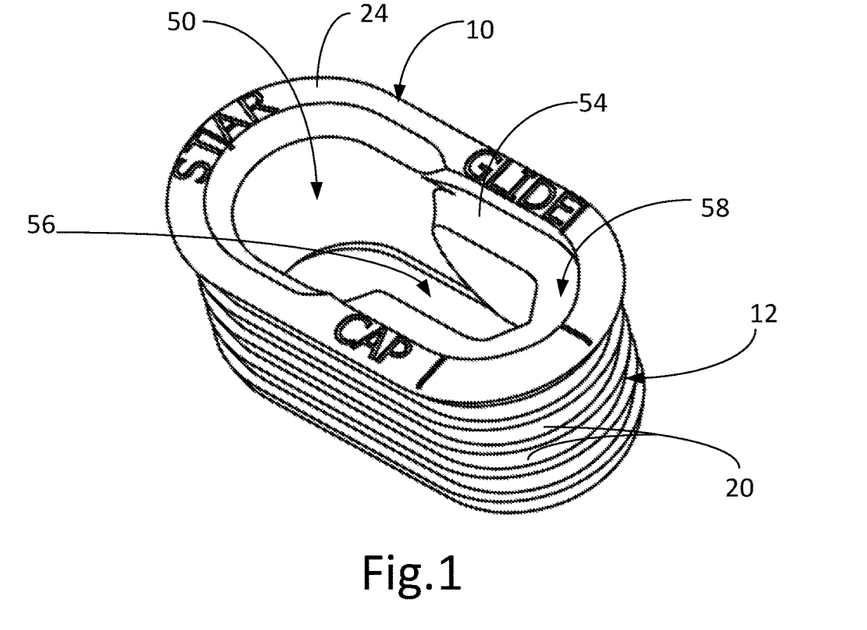
FIG. 1 shows a front perspective view of a panel fastener according to the present invention.
Figure 2:
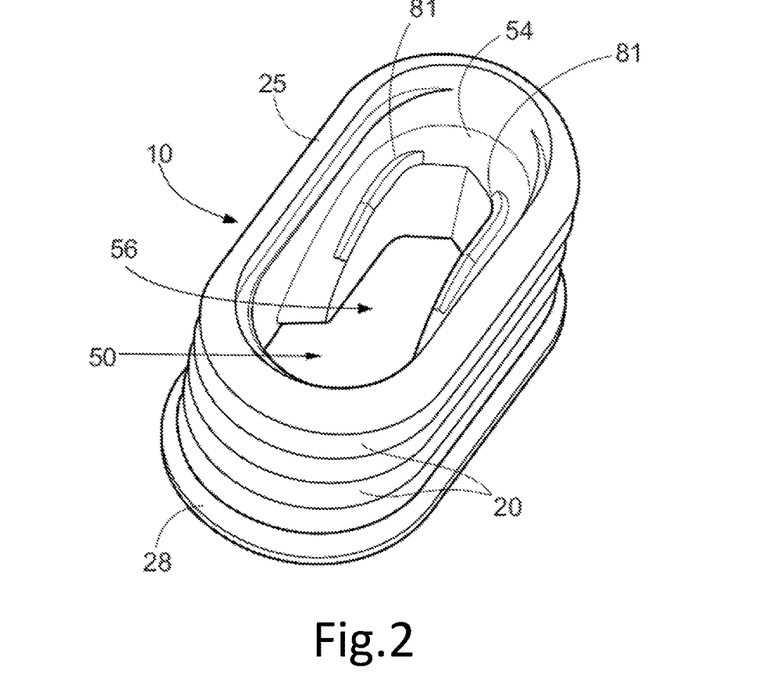
FIG. 2 shows a rear perspective view of the panel fastener according to the present invention.

In the illustrate embodiment, referring to FIGS. 2 and 4, a crush ridge 81 is disposed on rear wall 76 and angled receiving face 78 of slot flange 54 for engaging head portion 60 of hanger member 52. As head portion 60 is slotted into narrowed hanger channel 56, any slack between head portion 60 and rear wall 76, and between front wall 80 and support collar 62, is eliminated by crush ridge 81. Crush ridge 81 is deformable to form a tight friction fit of hanger member 52 and slot flange 54 as head portion 60 slides down receiving face 78 to rear wall 76.

Referring to FIGS. 6-10, a slot cap 90 is provided for being received into a recess 91 (FIG. 3) in rear surface 25 of hanger slot 50 of elongate mounting body 12. Slot cap 90 includes a locking arm 92 for engaging head portion 60 of hanger member 52 when inserted into narrowed hanger channel 56 of slot flange 54 for resisting removal of hanger member 52 from narrowed hanger channel 56. In the illustrated embodiment, locking arm 92 is carried by slot cap 90 at a single distal end with the remainder of locking arm 92 free to flex. Accordingly, when hanger member 52 is placed into narrowed hanger channel 56, head portion 60 pushes locking arm 92 outward. Locking arm 92 includes a securing lip 94, defined by a clear edge, which engaged head portion 60 of hanger member 52 and locks hanger member in narrowed hanger channel 56 to prevent removal. In the illustrated embodiment, the opposite side of locking arm 92 may include a securing ridge 96, which is rounded instead of having a sharp lip like securing lip 94. Slot cap 90 can be reversed so that securing ridge 96 is disposed in hanger slot 50 for engaging head portion 60. By providing a more rounded ridge to securing ridge 96, head portion 60 is resists removal from narrowed hanger channel 56 but with sufficient force can bias locking arm 92 outward to allow hanger member 52 to exit into narrowed hanger channel 56.

Referring to FIG. 11, a wall panel 18 is flush mounted to a wood furring 16. To install wall panel in this flush arrangement, first, an opening 14 must be cut into wood furring 16 complementary to a circumference of mounting body 12 of panel fastener 10 so that mounting body 12 is received into opening 14 in a generally friction fit arrangement with ridges 20 engaging the interior wood of opening 14. Next, panel fastener 10 is inserted into complementary opening 14 so that front surface 24 of mounting body 12 is flush with exterior side 30 of wood furring 16. Next, a marking member, which has sharp distal end for forming an indent in a back side of wall panel 18 is inserted into narrow hanger channel 56 of hanger slot 50 with a marking point extending outward beyond front surface 24. Next, wall panel 18 is aligned against wood furring 16 at a desired position for installation. Wall panel 18 is then pressed against wood furring 16 once aligned in the desired position so that marking member makes an indent mark on wall panel 18. In the illustrated embodiment, a hole is drilled at the indent mark to receive shaft 64 a hanger member 52. Certain screw types may not necessitate the drilling of a hole to received hanger member 52. Next, hanger member 52 is inserted into wall panel 18 at the indent mark so that a remainder of hanger member 52 projection from wall panel 18 is fully receivable into hanger slot 50. Finally, hanger member 52 projecting from wall panel 18 is fully inserted into hanger slot 50 and secured in narrow hanger channel 56 so that wall panel 18 is flush mounted to wood furring 16.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A panel fastener for removably flush mounting a wall panel to a wood furring, said panel fastener comprising:
a mounting body adapted for being inserted into a complementary opening in the wood furring;
a hanger slot disposed in said mounting body for receiving a hanger member carrying the wall panel;
said hanger slot including a generally U-shaped slot flange disposed within a portion of said hanger slot and defining a narrowed hanger channel for securing said hanger member in said hanger slot;
said slot flange including a first angled bottom surface and a second angle bottom surface arranged in a generally "V" shape so that when said hanger member is received in said slot flange, said hanger member engages and rests on said first and second angled bottom surfaces which centers said hanger member within said narrowed hanger channel;
a slot cap disposed in a rear side of said mounting body enclosing a rear side of said hanger slot; and,
a locking arm included on said slot cap for engaging a head portion of said hanger member when inserted into said narrowed hanger channel of said slot flange to resist removal of said hanger member from said narrowed hanger channel.

2. The panel fastener of claim 1 including a series of ridges extending circumferentially around an exterior side surface of said mounting body for engaging the wood furring when inserted into said complementary opening.

3. The panel fastener of claim 1 wherein said series of ridges are angled toward a front surface to resist removal of said mounting body from said wood furring.

4. The panel fastener of claim 1 wherein said slot flange includes angled receiving faces disposed along an upper portion on opposing sides of said slot flange directing entry of said hanger member into said narrowed hanger channel.

5. The panel fastener of claim 4 wherein each of said angled receiving faces extend in a first direction sloping from an interior side wall of said hanger channel to a side wall of said slot flange defining said narrowed hanger channel.

6. The panel fastener of claim 5 wherein each of said angled receiving faces extend in a second direction from a front wall of said slot flange to a rear wall of said slot flange defining a rounded shoulder that angles downwardly into said narrowed hanger channel.

7. The panel fastener of claim 6 wherein each of said angled receiving faces biases said hanger member inwardly toward a rear surface of said mounting body upon entering said narrowed hanger channel to direct the wall panel carried by said hanger member against the wood furring.

8. The panel fastener of claim 1 including a crush ridge disposed on said slot flange for engaging said hanger member to assist in forming a friction fit arrangement between said hanger member and said slot flange.

9. The panel fastener of claim 8 wherein said crush ridge is deformable when engaged by said hanger member to reduce slack between said hanger member and said slot flange for forming said friction fit arrangement.

10. The panel fastener of claim 1 wherein said hanger member includes a head portion laterally spaced from a support collar along a shaft, wherein said hanger member is carried in said narrowed hanger channel with said slot flange disposed between said head portion and said support collar.

11. The panel fastener of claim 10 wherein said slot flange is recessed from a front surface of said mounting body defining a flange recess area in a portion of said hanger slot.

12. The panel fastener of claim 11 wherein said support collar is disposed in said flange recess area so that only said shaft of said hanger member extends beyond said front surface of said mounting body.

13. The panel fastener of claim 12 wherein said support collar is laterally movable within said flange recess area to accommodate lateral shifting of said hanger member in said narrowed hanger channel.

14. The panel fastener of claim 1 wherein said hanger member is laterally movable between side walls of said slot flange when disposed within said narrowed hanger channel to provide play during installation and accommodate panel expansion.

15. The panel fastener of claim 1 wherein said locking arm is flexibly carried by said slot cap so that when said hanger member is directed into said narrowed hanger channel said hanger member biases said locking arm outwardly.

16. The panel fastener of claim 15 wherein said locking arm includes a securing lip defining a clear edge for engaging said hanger member when positioned within said narrowed hanger channel and locking said hanger member in said narrowed hanger channel.

17. The panel fastener of claim 15 wherein said slot cap is removable from said mounting body and said locking arm includes a securing ridge on an opposite side surface from said securing lip for engaging said hanger member, wherein said securing ridge is defined by a rounded edge for releasable securing said hanger member in said narrowed hanger channel.

18. A method of flush mounting a wall panel to a wood furring comprising the steps of:
cutting an opening into the wood furring complementary to a circumference of a panel fastener, said panel fastener comprising:
a mounting body adapted for being inserted into a complementary opening in the wood furring;

a hanger slot disposed in said mounting body for receiving a hanger member carrying the wall panel;

said hanger slot including a generally U-shaped slot flange disposed within a portion of said hanger slot and defining a narrowed hanger channel for securing said hanger member in said hanger slot;

a slot cap disposed in a rear side of said mounting body enclosing a rear side of said hanger slot; and, a locking arm included on said slot cap for engaging a head portion of said hanger member when inserted into said narrowed hanger channel of said slot flange to resist removal of said hanger member from said narrowed hanger channel;

inserting said panel fastener into said complementary opening cut into said wood furring so that a front surface of said mounting body is flush with an exterior side of said wood furring;

inserting a marking member into said hanger slot with a marking point extending outward from said hanger slot;

aligning said wall panel against said wood furring at the desired position for installation;

pressing said wall panel toward said wood furring once aligned in the desired position so that said marking member makes an indent mark on said wall panel;

inserting a hanger member into said wall panel at said indent mark so that the remainder of said hanger member projection from said wall panel is receivable into said hanger slot; and, inserting said hanger member projecting from said wall panel into said hanger slot so that said wall panel is flush mounted to said wood furring.

19. A panel fastener for removably flush mounting a wall panel to a wood furring, said panel fastener comprising:

a mounting body adapted for being inserted into a complementary opening in the wood furring;

a hanger slot disposed in said mounting body for receiving a hanger member carrying the wall panel;

said hanger slot including a generally U-shaped slot flange disposed within a portion of said hanger slot and defining a narrowed hanger channel for securing said hanger member in said hanger slot;

a slot cap disposed in a rear side of said mounting body enclosing a rear side of said hanger slot; and, a locking arm included on said slot cap for engaging a head portion of said hanger member when inserted into said narrowed hanger channel of said slot flange to resist removal of said hanger member from said narrowed hanger channel.

* * * * *